US006095724A

United States Patent [19]

Hurt

[11] Patent Number: 6,095,724

[45] Date of Patent: Aug. 1, 2000

[54] ADJUSTABLE DRILL STAND ASSEMBLY FOR DRILLING OVERHEAD CONCRETE OR OTHER OVERHEAD SURFACES

[76] Inventor: David L. Hurt, 2471 Center Rd., Clinton, Ohio 44216

[21] Appl. No.: 09/238,284

[22] Filed: Jan. 28, 1999

[51] Int. Cl.[7] .................................................. B23B 45/14

[52] U.S. Cl. ........................ 408/136; 408/234; 408/712

[58] Field of Search .................................. 408/234, 712, 408/99, 136

[56] References Cited

U.S. PATENT DOCUMENTS

| | | | |
|---|---|---|---|
| 2,405,110 | 8/1946 | Bullock | 77/7 |
| 4,235,565 | 11/1980 | Albano | 408/99 |
| 4,442,905 | 4/1984 | Agoston | 136/73 |
| 4,736,804 | 4/1988 | Geibel | 408/99 |
| 4,740,119 | 4/1988 | Lierz | 408/712 |
| 5,295,620 | 3/1994 | Cousineau et al. | 408/136 |
| 5,322,397 | 6/1994 | Spear | 408/99 |
| 5,342,153 | 8/1994 | Dobkins | 408/712 |
| 5,348,428 | 9/1994 | Turner | 408/99 |
| 5,820,317 | 10/1998 | Van Troba | 408/136 |

FOREIGN PATENT DOCUMENTS

| | | |
|---|---|---|
| 2220112 | 1/1973 | Germany . |
| 2643-598 | 3/1978 | Germany . |
| 143-047 | 7/1980 | Germany . |
| 40 6-11461 | 4/1994 | Japan . |

*Primary Examiner*—Daniel W. Howell
*Assistant Examiner*—Erica Ergenbright

[57] ABSTRACT

An improved drill stand assembly for supporting a power drill in an elevated and inverted position and for advancing and retracting the drill towards and away from an overhead work surface without regard to angular displacement of the drill bit, the drill stand assembly including a measuring gauge and a measuring gauge locking device, an inner tubular column slidably located within an outer tubular column on which the drill is mounted, a lever pivotally connected at a pivot point to an outer column support collar, a linkage pivotally connected at its upper end to a pivot point on the lever and pivotally connected at its lower end to a pivot point attachment mechanism comprising a releasable locking clamp in cooperative relation with a locking compression collar that are slidably located on the inner column.

9 Claims, 4 Drawing Sheets

ADJUSTABLE DRILL STAND ASSEMBLY FOR DRILLING OVERHEAD CONCRETE OR OTHER OVERHEAD SURFACES

BACKGROUND—FIELD OF INVENTION

This invention relates generally to the drilling of overhead concrete or other overhead surfaces.

BACKGROUND—DESCRIPTION OF PRIOR ART

In the commercial installation of overhead fasteners into concrete or other overhead surfaces it is usually necessary to drill numerous holes. This commonly is done using a hand held power drill. Repetitive overhead drilling can place a great deal of physical stain on a worker because not only must the drilling pressure be applied upwardly but the weight of the drill must be supported as well. In addition, the worker generally must ascend a ladder or other elevating device for each hole to be drilled. To render matters worse, being on a ladder or other elevating device positions the worker in close proximity to the dust and debris generally associated with the drilling of overhead concrete or other overhead surfaces.

Several types of apparatus for supporting a power drill in an overhead elevated position have been proposed. U.S. Pat. No. 2,405,110 (1945) to Bullock discloses a complex adjustable strut drill equipped with a plunger that is retracted by a tension spring. U.S. Pat. No. 4,442,905 (1984) to Agoston shows a complex portable jig assembly that includes a carriage and a first and second tubular portion that is positioned away from a post. U.S. Pat. No. 5,322,397 (1994) to Spear shows an apparatus designed to support a drill and a planar support member attached to a top portion of a column that requires a ratchet-type jacking mechanism to facilitate height adjustment and admits that there will be some angular displacement of the axis of rotatation of the drill chuck.

Prior art has not solved the problem of providing a overhead drilling device that is lightweight, that provides substantially immediate and precise height adjustment, that provides a means to allow the drill bit to naturally gravitate out of the hole being drilled, that has a measuring means designed to reduce the need to utilize elevating devices in order to pre-mark the location of holes to be drilled, and that does not require components such as tension springs, plungers, or ratchet-type jacking mechanisms, and that are not prohibitively expensive to manufacture and maintain.

OBJECTS AND ADVANTAGES

Accordingly, several objects and advantages of my adjustable drill stand assembly are:

(a) to provide a drill stand for drilling overhead concrete and other overhead surfaces that is durable, simple in construction and operation and is therefore inexpensive to manufacture and maintain;

(b) to provide a drill stand that is lightweight and is therefore easily portable to each location where holes are to be drilled;

(c) to provide a drill stand with an adjustable measuring gauge thereby reducing the necessity of ladder or other elevating means that are commonly required for a worker to pre-mark overhead holes to be drilled;

(d) to provide a drill stand that substantially provides a healthier environment for workers by greatly reducing the need of ladders or other elevating devices normally required when drilling overhead surfaces, and especially in providing a substantially healthier environment for workers by distancing the workers face and body away from the concentrated area of dust and debris that is commonly associated with drilling overhead concrete or other overhead surfaces with a hand held power drill when working from a ladder or other elevated device;

(e) to provide a drill stand that will substantially decrease the physical exertion normally required of a worker to drill concrete or other overhead surfaces, thereby increasing the workers ability to complete overhead concrete or other overhead surface drilling operations in a more economical and competitive time period;

(f) to provide a drill stand that is easily and quickly adjustable in height by means of a quick setting height adjustment mechanism that provides substantially immediate and precise height settings so as to accomodate varied height requirements commonly associated with the drilling of overhead concrete or other overhead surface heights, including overhead surfaces located above such objects as heating, ventilating, and air conditioning units;

(g) to provide a drill stand capable of drilling overhead concrete or other overhead surfaces that are located in relatively inaccessible locations where it would not be possible to drill with manually applied pressure, because of the remote location of the pressure applicator;

(h) to provide a drill stand that will move the drill and drill bit upwardly into the overhead concrete or other overhead surface on a substantially precise axis without concern to angular movement; and, (i) to provide a drill stand that allows the drill and drill bit to gravitate on its own momentum at the direction of the worker out of the hole being drilled thus accomplishing the necessary requirement of cooling the drill bit, as well as clearing particles and dust from the drilled hole prior to the installation of a fastening device.

Further objects and advantages of my drill stand will become apparent from a consideration of the drawings and ensuing description.

REFERENCE NUMBERS IN DRAWINGS

10—drill stand assembly
12—foot plate w/rubber pad
14—inner column
16—locking compression collar
18—releasable locking clamp 20—linkage
21—pivot point
22—outer column support collar
23—pivot point
24—lever
25—pivot point
26—outer column
30—power drill left upright support
31—power drill right upright support
32—power drill trigger lock
33—a power drill
34—measuring gauge
35—power drill saddle base
36—manual grip
37—measuring gauge locking device
38—overhead surface

SUMMARY OF THE INVENTION

In accordance with the present invention my drill stand assembly comprises a drill saddle for supporting a power drill in an elevated and inverted position, a feed mechanism comprising an inner tubular column slidably located within an outer tubular column, a releasable locking clamp in cooperative relation with a locking compression collar located on the inner column that provides height adjustment and locks the drill stand into a selected height for the advancement and retraction of the power drill mounted thereon. The feed mechanism further includes a lever that is pivotally connected to a outer column support collar that is secured to the bottom end of the outer column.

A linkage is pivotally connected at its upper end to a predetermined pivot point on the lever, and on its lower end the linkage is pivotally connected in combination to the locking compression collar and the releasable locking clamp located on the inner column. Such arrangement provides the substantially immediate setting of the required height necessary to advance the drill bit into a overhead surfaces to be drilled.

In another aspect, the invention features an adjustable measuring gauge attached to the drill saddle assembly. The measuring gauge comprises a generally horizontal rod in conjunction with an adjustable locking device whereupon the measuring gauge is manually set by the worker to extend outward to a vertical wall, window or other available vertical surface. Such arrangement provides for a quick and accurate locator of the holes to be drilled into the overhead surface, thereby reducing the need for the worker to acsend a ladder or other elevating device in order to premark the location of holes to be drilled into the overhead surface.

DETAILED DESCRIPTION

Figure 1:
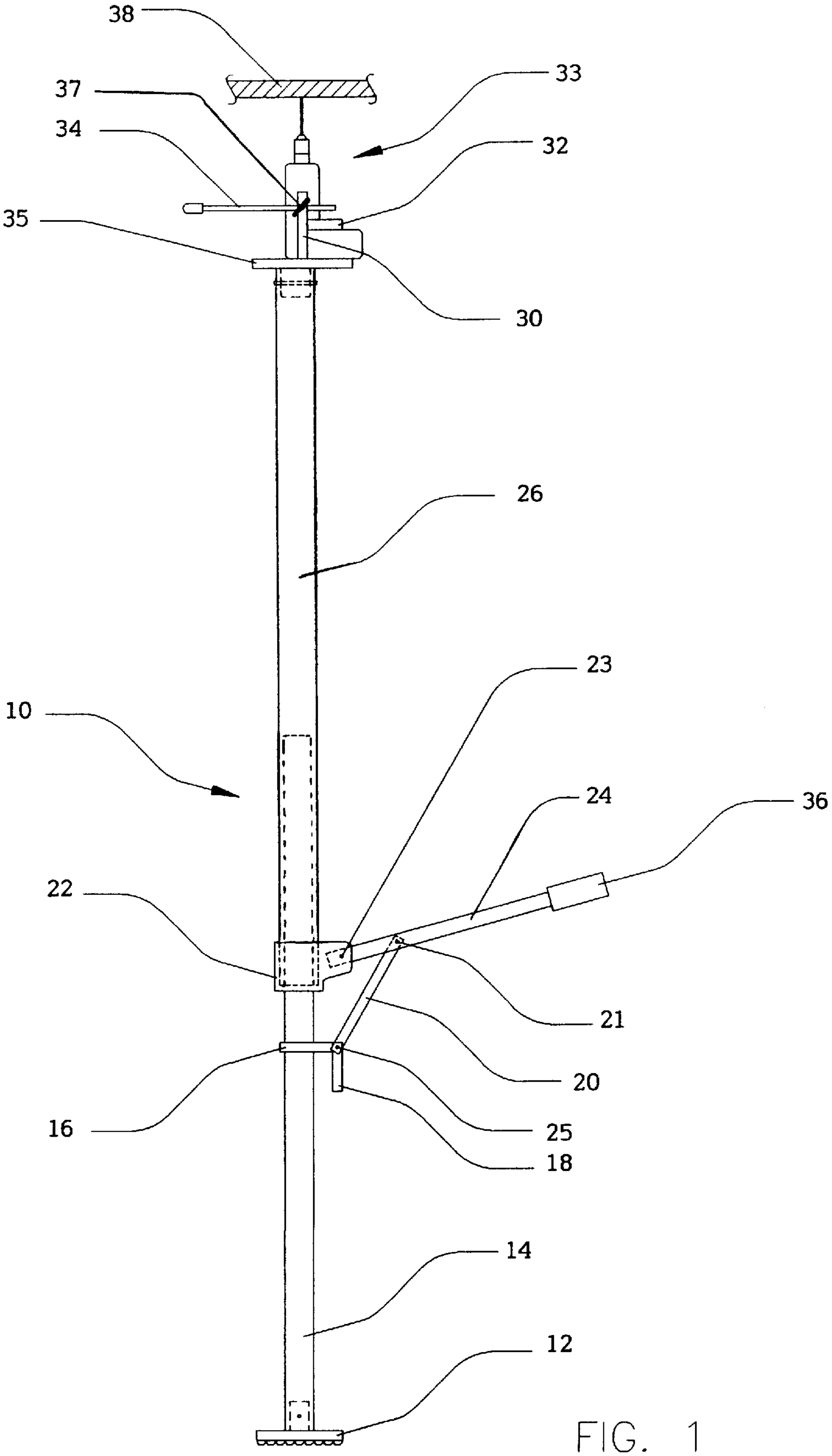
FIG. 1 is a left side elevational view of my drill stand assembly for supporting a power drill constructed according to the present invention, showing the drill in a downward retracted position.

Referring now initially to FIG. 1, a drill stand assembly for supporting a power drill in an elevated and inverted position constructed according to the invention is designated generally by reference numeral 10. Drill stand assembly 10 generally includes an inner column 14, an outer column 26, a drill saddle base 35, a pair of drill upright supports 30 and 31 (see FIG. 1A for right upright drill support 31) a drill trigger lock 32, a measuring gauge 34, a measuring gauge locking device 37, a locking compression collar 16, a releasable locking clamp 18, a lever 24, a manual grip 36, a linkage 20, an outer column support collar 22, a foot plate 12 all of which hereinafter are described in greater detail.

Releasable locking clamp 18 is one of any one of a number of such mechanisms that are well known in the mechanical arts. Preferably, releasable locking clamp 18 is one of the well known quick adjustment mechanisms commonly used for the adjustment of bicycle seat heights.

Figure 1A:
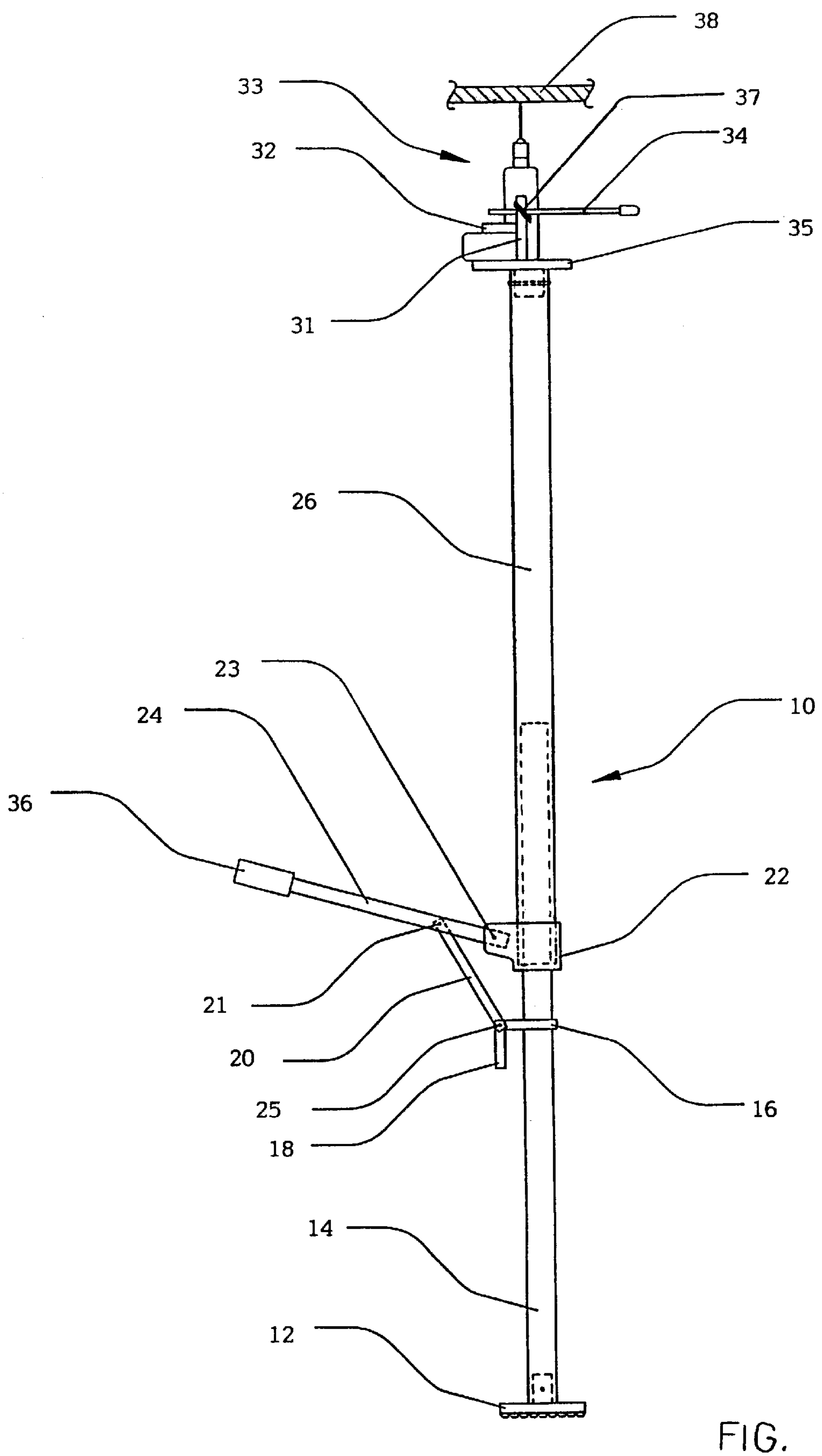
FIG. 1A is a right side elevational view of my drill stand assembly, again showing the drill in a downward retracted position.

Drill saddle base 35 is attached to the top of outer column 26. A power drill 33 is attached to drill saddle base 35 in an inverted position in combination with drill upright support 30, drill upright support 31, and drill trigger lock 32, as shown in FIGS. 1 and 1A.

Measuring gauge 34 is attached to either drill upright support 30 or drill upright support 31 and is secured into the desired setting by manually locking measuring gauge locking device 37.

Measuring gauge locking device 37 is one of any one of a number of such devices that are well known in the mechanical field of threaded locking devices.

The particular means by which power drill 33 is mounted to drill stand assembly 10 may vary as long as power drill 33 is securely held thereon with the drill bit axis extending parallel to the axis of drill stand assembly 10.

Figure 2:
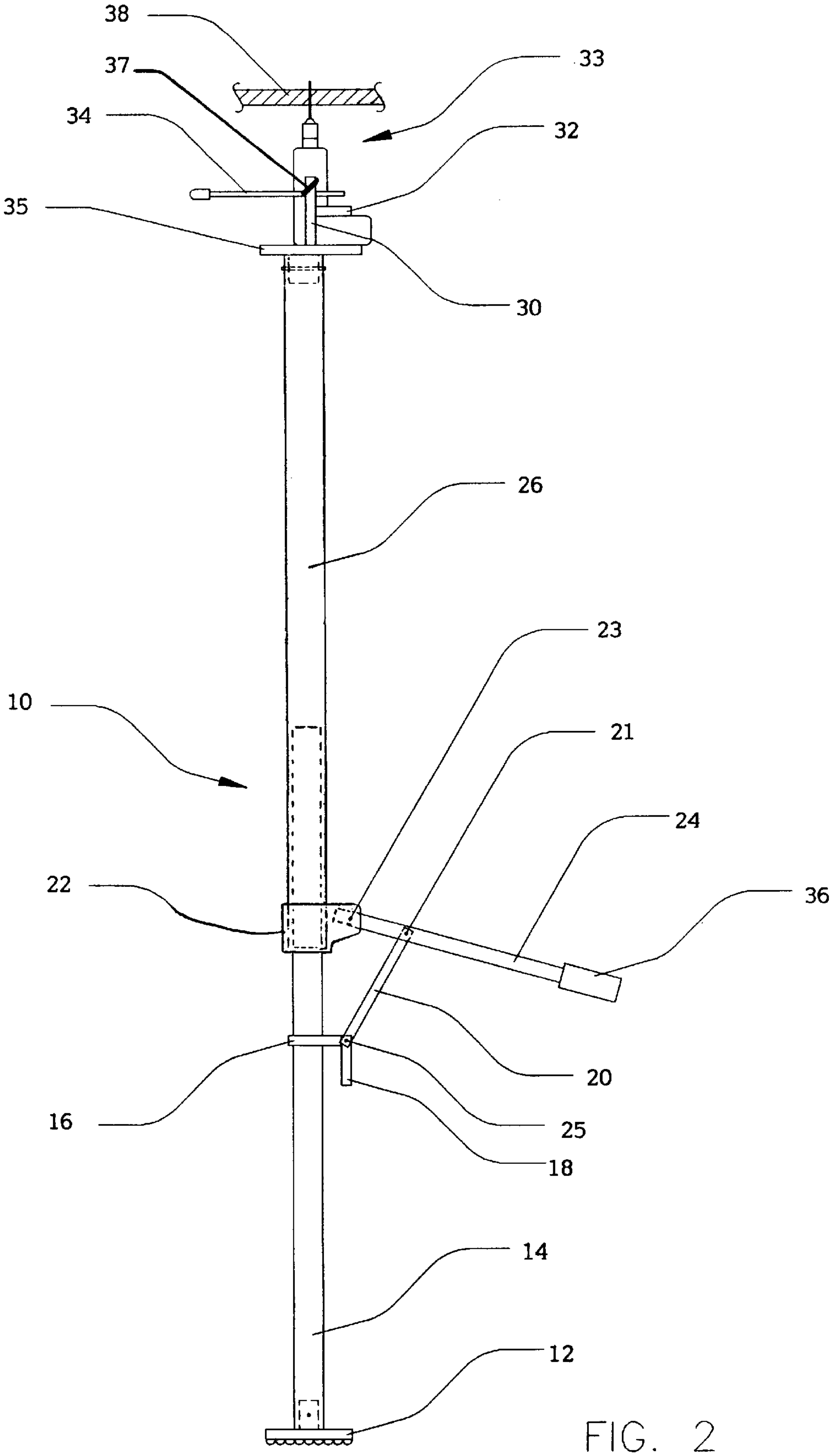
FIG. 2 is another elevated view of my drill stand assembly, showing the drill in an upward extended position.
Figure 3:
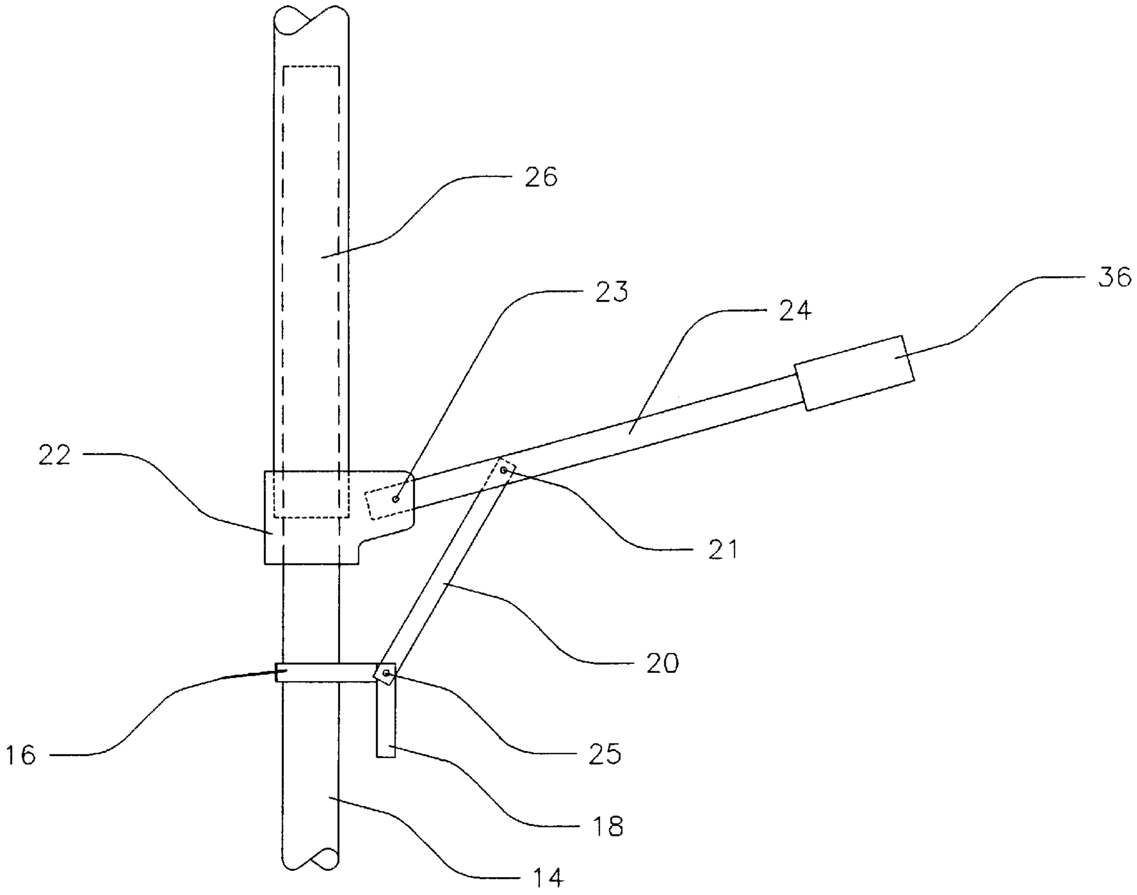
FIG. 3 is an enlarged elevated view of the inventive combination height adjustment and height locking mechanism, and the inventive feed mechanism.

Referring now additionally to FIG. 3, the feed mechanism can be seen to include as illustrated, a generally horizontal lever 24, lever 24 being pivotally connected at a pivot point 23 to outer column support collar 22. Outer column support collar 22 is connected to the lower end of outer column 26. Linkage 20 is pivotally connected at its upper end to a pivot point 21 on lever 24 and at its lower end linkage 20 is pivotally connected to a pivot point 25 in combination with locking compression collar 16 and releasable locking clamp 18 that are located on inner column 14. As is seen by a comparison of FIGS. 1 and 2, there is no angular displacement of power drill 33 between the lowermost and uppermost positions of drill stand assembly 10.

Still referring FIG. 3, locking compression collar 16 in combination with releasable locking clamp 18 are slidably mounted on inner column 14. Releasable locking claim 18 is manually operated to either lock or unlock locking compression collar 16 to inner column 14 so as to effect exact height adjustment of drill stand assembly 10 by manually sliding in combination locking compression collar 16, unlocked releasable locking clamp 18, linkage 20, outer column 26, and lever 24 either upward or downward on inner column 14 toward or away from a overhead surface 38 until the selected height of drill stand assembly 10 is obtained. Foot plate 12 as seen in FIG. 1, is attached to the lower end of inner column 14 and for purposes of height adjustment foot plate 12 is utilized by placement of the workers foot thereon to retain inner column 14 in position while either upward or downward height adjustment is being made.

Accordingly, releaseable locking clamp 18 is then manually locked thereby securing locking compression collar 16 onto inner column 14 and thus locking drill stand assembly 10 at the selected height required to drill overhead surface 38.

More particularly, foot plate 12 is fabricated to include a skid resistant rubber base adapted to rest on a fixed surface opposite overhead surface 38 and due to its size, foot plate 12 provides stabilization as well forward, rearward, and sideward tilting of drill stand assembly 10.

SUMMARY, RAMIFICATIONS, AND SCOPE

Accordingly, the reader will see that my drill stand assembly has advantages in that

- it provides a wide range of immediate and precise height adjustment settings without requiring complex components;

it provides a measuring device that permits the worker to drill overhead holes without prior measuring and pre-marking of the locations of holes to be drilled;

it is lightweight, durable, and simple in construction and operation;

it moves the power drill and drill bit upwardly with no angular displacement.

Although my drill stand assembly has been described by way of a particular preferred embodiment, various substitutions of equivalents may be affected without departing from the spirit and scope of the drill stand assembly as set forth in the following claims. For example, the drill stand assembly may be utilized as a horizontal drilling device or for the drilling of floors.

Thus the scope of the invention should be determined by the appended claims and their legal equivalents, rather than by the examples given.

I claim:

1. An adjustable drill stand assembly for supporting a power drill with a chuck at one end in an elevated and inverted position said adjustable drill stand assembly comprising:

a inner column and a outer column, said inner column being slidably located within said outer column;

a measuring means comprising a measuring gauge and a measuring gauge locking device;

a stabilization means comprising a foot plate attached to the lower end of said inner column;

attachment means for supporting and securing said power drill to the upper end of said outer column;

actuating means comprising a lever pivotally connected at a pivot point to a outer column support collar;

a linking means comprising a linkage pivotally connecting said lever to a locking compression collar on said inner column;

a lockable height adjustment means in combination with said locking compression collar, said linkage, said lever, said outer support collar, and said slidable inner column for height adjustment of said adjustable drill stand assembly, whereby said adjustable drill stand height adjustment can be made substantially instantaneous and without concern for angular displacement of a power drill axis, and whereby said measuring gauge can be utilized to locate holes to be drilled without the need to first manually measure and mark locations of holes to be drilled.

2. The adjustable drill stand assembly of claim 1, wherein said inner column and outer column are composed of tubular aluminum.

3. The adjustable drill stand assembly of claim 1, wherein said attachment means for supporting and securing said power drill to the upper end of said outer column comprises a drill saddle, a power drill left upright support, a power drill right upright support and a power drill trigger lock.

4. The adjustable drill stand assembly of claim 1, wherein said actuating means comprises said lever pivotally connected at a pivot point to said outer column support collar, said lever extending in a moderately upward angle from said outer column support collar.

5. The adjustable drill stand assembly of claim 1, wherein said linking means comprises said linkage pivotally connected at a linkage upper end to a pivot point on said lever and pivotally connected at a linkage lower end to said locking compression collar in combination with said lockable height adjustment means.

6. The adjustable drill stand assembly of claim 5, wherein said locking compression collar in combination with said lockable height adjustment means are slidably located on said inner column.

7. The adjustable drill stand assembly of claim 1, wherein said height adjustment means comprises said lockable height adjustment means in combination with said compression collar and said inner column.

8. The adjustable drill stand assembly of claim 1, wherein said measuring means comprises said measuring gauge and said measuring gauge locking device in combination with either a left or a right power drill upright supports.

9. The adjustable drill stand assembly of claim 1, wherein said footplate comprises a skid resistant rubber pad.

* * * * *